United States Patent
Danpour

(10) Patent No.: US 7,499,885 B2
(45) Date of Patent: Mar. 3, 2009

(54) DIRECT ONLINE MORTGAGE AUCTION NETWORK

(76) Inventor: John Danpour, 198 Russell Dr., Walnut Creek, CA (US) 94598

( * ) Notice: Subject to any disclaimer, the term of this patent is extended or adjusted under 35 U.S.C. 154(b) by 1227 days.

(21) Appl. No.: 10/013,019

(22) Filed: Nov. 30, 2001

(65) Prior Publication Data
US 2002/0091629 A1 Jul. 11, 2002

Related U.S. Application Data

(60) Provisional application No. 60/250,108, filed on Dec. 1, 2000.

(51) Int. Cl.
G06Q 40/00 (2006.01)

(52) U.S. Cl. .......................... 705/38; 705/35
(58) Field of Classification Search .................. 705/50, 705/80, 37
See application file for complete search history.

(56) References Cited

U.S. PATENT DOCUMENTS 5,995,947 A * 11/1999 Fraser et al. .................. 705/38
6,233,566 B1 * 5/2001 Levine et al. ............. 705/36 R

* cited by examiner

Primary Examiner—Andrew J. Fischer
Assistant Examiner—Chrystina Zelaskiewicz
(74) Attorney, Agent, or Firm—Sofer & Haroun, LLP

(57) ABSTRACT

The present invention provides a computerized (Internet, online) network for home mortgage borrowers to compete against each other and other mortgage companies (brokers) in an auction format for certain pools of funds. These funds are provided to the auction from the secondary mortgage market in pools on a daily (hourly) basis. The present invention provides qualified participants with a direct link to the secondary mortgage market, hence bypassing some middlemen (wholesalers and retailers) in the process. Participants go to a common Web site and complete a loan application. The participants then electronically submit the loan application to the common Web site. The loan application is then underwritten, and if approved, the participant is issued an approval code. With the approval code, the participant can then submit a bid at the auction. Subsequent to the approval of the bid, the borrower can close escrow at the interest rate and the bid price. The auction can change on a daily (hourly) basis, as pricing of the loan products is in real time figures.

12 Claims, 5 Drawing Sheets

AUCTION NUMBER 012698F

PRODUCT : 30 YEAR FIXED RATE LOANS
Minimum loan amount $50,000
Maximum loan amount $252,700

BASE RATE: 7.25%

You are bidding on points only!

| | | |
|---|---|---|
| Auction begins: 10/25/00 @ 9:51 a.m.<br>Auction ends : 10/26/00 @ 8:26 a.m.<br>Loan must close by: 12/5/00 12:00 p.m.<br><br>Highest bid received: 7.25 % + 1.25 points | Total funds available in this auction:<br>$10,000,000.00<br>Remaining amount:<br>$3,235,300<br><br>[Current Bidders] | Note: Your approval code must have an FN prefix so you may participate in this auction. |

You are bidding on the following base interest rate and points : 7.25% + 1.25 points
Bidders in this auction have the following rate options as well:

You need only bid on the base rate of 7.25%. You may choose other rate and point combinations.
Click the options button below to see what other rate/point options will be available to you if you are a successful bidder.

Click here to review other lender fees charged at settlement:
[Fees]

The minimum required bid for the interest rate of 7.25% is 1.25 points. Your final bid may be subject to add ons. Click here to see if your loan is subject to any add ons. Bids are in 0.125 point increments. Complete the following if you would like to bid in this auction:

Enter your approval code: [          ]
Enter the points you would like to pay on the interest rate of 7.25% [1.25 points ▼]
Click on Options button to determine other rate/point options for your bid.
[Place Bid] [Cancel Bid] [Calculate My APR] [Options] [My Add Ons]

FIGURE 1

AUCTION NUMBER 012698F

PRODUCT : 30 YEAR FIXED RATE LOANS
Minimum loan amount $50,000
Maximum loan amount $252,700

BASE RATE: 7.25%

You have chosen a rate of 7.25% with a base loan fee of 1.25 points for a loan amount of $226,000.00. In addition to the above loan fee you have the following add ons:

Non-owner occupied feature: Add 1.50 to points

Your locked in rate and fee will be: 7.25% with 2.75 points APR 7.578 should your bid be a wining bid. You will also be allowed any of the following options as well:

6.875 % + 4.25 points APR 7.352
        7.00 % + 3.75 points APR 7.428
        7.125 % + 3.25 points APR 7.503

You will be required to close your escrow by 12/5/00 at 12:00 p.m., otherwise your rate will expire and you will be subject to cancellation fees.

Click on the appropriate button below to complete your bid. By clicking on, you will be asked to acknowledge the cancellation fees associated with a cancelled transaction.

FIGURE 2

BID CONFIRMATION

AUCTION NUMBER 012698F

I hereby understand that I am ready to accept the following terms for my loan, should my bid be accepted.

Loan Amount: $226,000

Base Rate: 6.875

Total Points: 4.25
APR: 7.352 %
Closing Date: 12/5/00 @ 12:00 P.M.

I understand that escrow must close no later than 12/5/00 12:00 p.m. Should escrow not close by this date, I understand that there is a 1% cancellation fee, or $2,260.

[Finalize My Bid] [Cancel My Bid]

FIGURE 3

DIRECT ONLINE MORTGAGE AUCTION NETWORK

CROSS-REFERENCE TO RELATED PATENT APPLICATIONS

The present application is a utility patent application, based upon provisional patent application Ser. No. 60/250,108, filed Dec. 1, 2000 entitled "DIRECT ONLINE MORTGAGE AUCTION", which is hereby incorporated by reference and applicant claims priority under 35 USC §120.

BACKGROUND OF THE INVENTION

Field of Invention

The present invention relates to a direct online mortgage auction network, and more particularly to provide a medium for an auction network designed to streamline processes in the primary and secondary mortgage market.

The secondary mortgage market is the market in which existing mortgages or mortgage-backed securities are bought and sold. Similar to other secondary markets, the purpose of the secondary mortgage market is to provide a channel to move funds from capital-surplus areas to capital-deficit regions. Mortgage companies use this channel to bring together providers of capital (investors) and those needing such funds (homebuyers and homeowners) in all regions of the country. Traditionally, these mortgage companies serve at the retail point-of-sale for this channel. Consequently, they can provide mortgages to a full range of homebuyers and homeowners and commercial enterprises. Point-of-sale mortgage providers may include mortgage brokers, commercial banks, thrifts, credit unions, savings and loan associations, savings banks, life insurance companies, and the like.

There are various institutions that facilitate the movement of funds for the mortgage companies. These entities include
   Federal National Mortgage Association ("Fannie Mae"),
   Federal Home Loan Mortgage Corporation ("Freddie Mac"),
   Government National Mortgage Association ("Ginnie Mae"),
   And Private Conduits These institutions purchase or securitize loans originated by mortgage companies. These purchases or securitizations recycle funds back to the originating mortgage company, allowing them to make loans to additional homebuyers.

In the last two decades, the secondary mortgage market has experienced major growth, become increasingly sophisticated, and become even more important as a source of funds for home mortgages (Source: Mortgage Bankers Association of America, 2001).

The traditional model for borrowers, as described above, has generally resulted in a multi-layered middleman process. As a result, the process produces interest rates, fees and a turnaround time higher than necessary, especially for borrowers that are well-qualified.

In view of the growth of the secondary mortgage market, and the increased accessibility of the Internet (World Wide Web), it would be desirable to provide an improved network, namely a direct online auction network, which would facilitate access to conduits in the secondary mortgage market. This invention would serve this purpose.

SUMMARY OF THE INVENTION

It is an objective of the present invention to provide a direct online mortgage auction network, in order to provide a direct access for funds in the secondary mortgage market to borrowers' and other mortgage companies.

The subject invention provides a computerized (Internet, online) network or system for home mortgage borrowers and mortgage companies to compete against each other in an auction format for certain pools of funds. This system is intended to be a component within an existing Web site infrastructure, whereby visitors can choose to participate in the auction model or select from other options available depending on the scope of the site. In one preferred embodiment, these funds are provided to the auction from the secondary market pools on a daily (or hourly) basis. This invention provides qualified borrowers and other mortgage companies (brokers) with a direct link to the secondary market, hence bypassing some middlemen (wholesalers and retailers) in the process. According to the present invention, direct access to an online mortgage auction system brings the availability of the secondary mortgage closer to the borrowers by streamlining the supply chain.

Borrowers or mortgage companies can go to a common Web site and complete a loan application. They then electronically submit the loan application to the Web site. The loan application is then underwritten, and if approved, an approval code is issued. With the approval code, the participant can then place a bid at the auction. The item that the participant will be bidding on is the interest rate or yield requirements provided by the conduits in the secondary mortgage market. The participants' bidding price would be in form of loan fees or points that they are willing to pay to obtain a mortgage at the posted rate. The auction can change periodically, as pricing of the loan products is in real time figures.

Other objects, features and advantages of the present invention will become apparent from the following detailed description, when taken in conjunction with the accompanying drawings.

BRIEF DESCRIPTION OF THE DRAWINGS

The accompanying drawings, which are incorporated in and form a part of this specification, illustrate embodiments of the invention, where like numerals identify like components, and, together with the following detailed description, serve to explain the principles of the invention:

FIGS. 1-3 show display pages for a participant using the direct online mortgage auction network of the present invention.

DETAILED DESCRIPTION OF THE INVENTION

Figure 4:
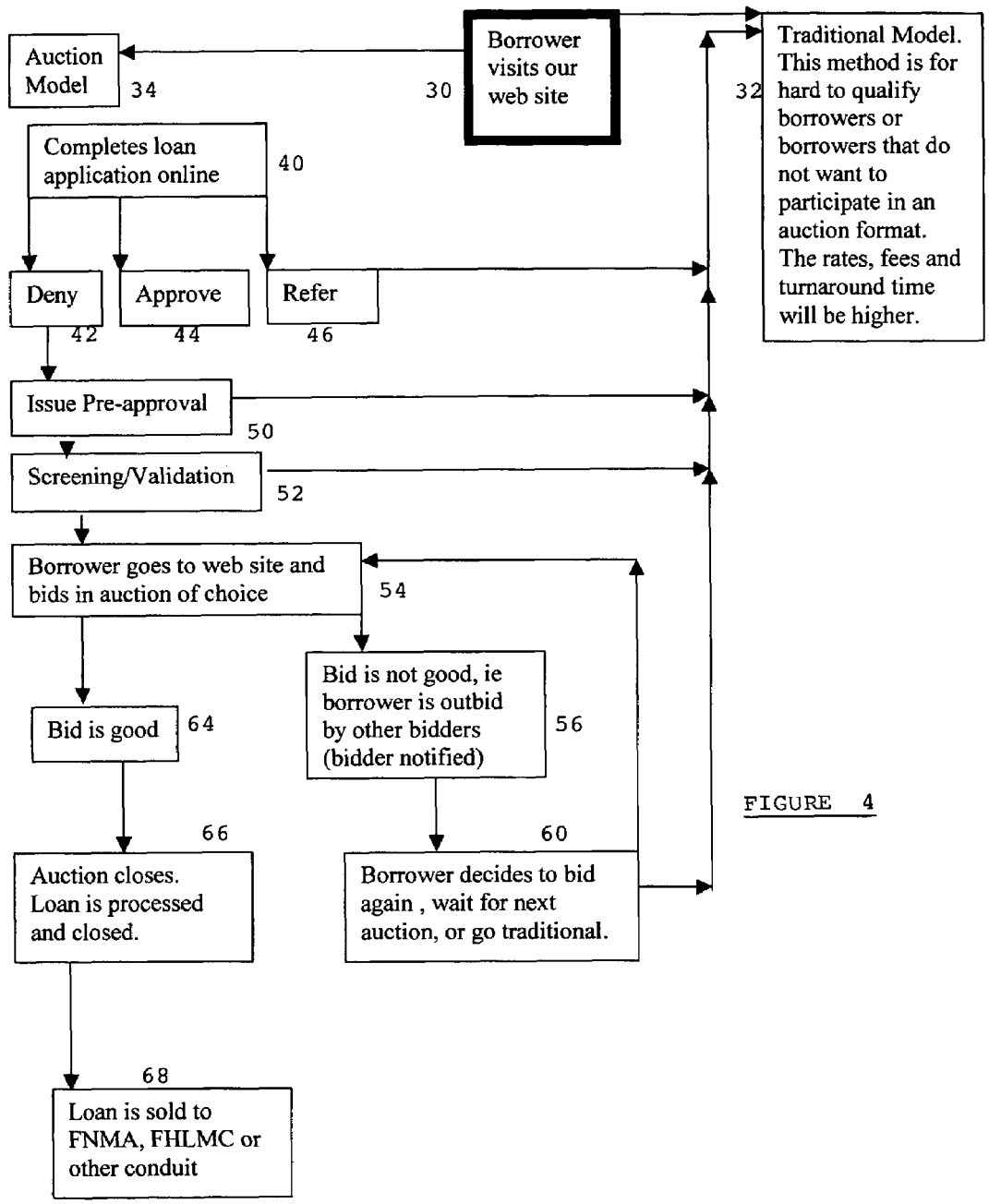
FIG. 4 shows a flow diagram of the steps involved with the direct online mortgage auction network of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The present invention provides a computerized (Internet, online) network or system for home mortgage borrowers and mortgage companies (brokers) to compete against each other in an auction format for certain pools of funds. These funds are provided to the auction from the secondary market in pools on a daily (hourly) basis. The present invention provides qualified borrowers with a direct link to the secondary market, hence bypassing some middlemen in the process. These middlemen are wholesalers and retailers.

Borrowers and mortgage companies (brokers)go to a common Web site and complete a loan application. They then electronically submit the loan application to the common web site. The loan application is then automatically underwritten, using industry standard automated underwriting software (such as Fannie Mae's DU system, Freddie Mac's LP system, or other available underwriting systems), and if approved, an approval code is issued. With the approval code, the participant can place a bid in the auction. The auction can change on a daily (hourly) basis, as pricing of the loan products is in real time figures.

FIG. 1 shows the first part of the direct online mortgage auction process according to the present invention. FIG. 1 provides the auction number, the base interest rate available to the bidders, the current list of accepted bidders, and the steps that the participants have to take to place a bid. If the participant does place a bid, a new page appears, as shown in FIG. 2.

FIG. 2 clearly spells out what the participants are bidding for, and the options to various interest rates. It also points out what the participants would have if they are a winning bidder.

FIG. 3 shows the final page in the auction process, which is a confirmation of the winning bid of the participant. Once accepted by the bidder, the bidder would be placed in the approved bidder list, as shown in FIG. 1.

If the pool of funds is exhausted, new bidders would have to increase the points they are willing to pay. Such action would replace the lowest bid. In the case of multiple and similar low bids, the last bidder of the lowest bid price in the pool is eliminated and replaced by the new higher bid. With this process, the auction continues until the deadline arrives. The winning bidders are then notified, and are given a fixed amount of time to close the transaction.

In the example shown in FIG. 1, the particular auction number assigned to the transaction is number 012698F. The example product is a 30-year fixed rate loan, with a minimum loan amount of $50,000, and a maximum loan amount of $252,700. The base rate is 7.25%. As illustrated, the approved participants are bidding on points only, as shown in FIG. 1.

In FIG. 1, the display shows that the auction begins on Oct. 25, 2000, at 9:51 AM, and that the auction ends at Oct. 26, 2000, at 8:26 AM. A further requirement shown in FIG. 1 is that the loan must close by Dec. 5, 2000, at 12:00 PM.

The total funds available in the example shown in FIG. 1 are $10,000,000, and the remaining amount in the example is $3,235,300. Also, the participant must have an FN prefix in the approval code in order to participate in the auction.

In the example shown in FIG. 1, the participant is bidding on a base interest rate of 7.25%. As displayed in FIG. 1, the bidder is advised that he need only bid on the base rate, but may choose other rate and point combinations. These other rate and point combinations are offered based on corresponding yield requirements from the secondary market. In other words these rate and point combinations will produce the same yield for the mortgage in the secondary market. Bidders in the particular auction have rate options as well. The bidder is prompted to click the options button shown in FIG. 1 to see what other rate/point options will be available to him/her if he/she is a successful bidder. Options with lower rates will include additional points that must be paid at closing. Options with higher rates will have points rebated at closing. The bid price, which will be in points, is added to the points that correspond to the participant's selected interest rate. Bids are in 0.125 increments.

As displayed in FIG. 1, the minimum required bid for the interest rate of 7.25% is 1.25 origination points. The final bid may be subject to add-ons, if applicable, and the bidder is prompted to see if his loan is subject to any standard add-ons, as shown in FIG. 1. For example, one add-on may involve properties that are not owner-occupied.

The bidder is prompted, as shown in FIG. 1, to complete all the necessary bid information if he/she wished to bid in that particular auction, which includes the entry of the approval code, entering the points he/she would like to pay on the particular interest rate of 7.25%, calculating the APR, viewing different options, viewing other lender fees, viewing applicable add-ons, and finally whether to place or cancel the bid. The winning bidders will qualify for their requested portion of the funds available in the particular auction, for the product loan shown in FIG. 1.

If the bidder does decide to place a bid from FIG. 1, a new page appears, as shown in FIG. 2, which is based upon the same auction number and product information shown in FIG. 1.

FIG. 2 clearly shows what the bidders are bidding for, and the options for various interest rates, and shows what they would obtain if they are the winning bidder. In the particular example shown in FIG. 2, the bidder has chosen a rate of 7.25%, with a base loan fee of 1.25 points for a loan amount of $226,000. In addition to the loan fee shown in FIG. 2, there are the additional add-ons for a non-owner occupied property, which adds 1.50 to the origination points (a total of 2.75 points).

In the example shown in FIG. 2, the interest rate of 7.25% with an APR of 7.578% is provided as the winning bidder. The bidder, as shown in FIG. 2, also will be allowed any of the following options:

6.875%+4.25 points APR 7.352
7.00%+3.75 points APR 7.428
7.125%+3.25 points APR 7.503

Also, the bidder in FIG. 2 will be required to close his escrow by Dec.5, 2000 at 12:00 PM, otherwise his rate will expire and he will be subject to cancellation fees.

In the example shown in FIG. 2, the bidder is prompted to click on the appropriate button to complete his bid. By clicking the "I Agree" button, the bidder will be asked to acknowledge the cancellation fees associated with a cancelled transaction. The bidder can click the "Cancel My Bid" button to cancel his bid, and the transaction ends.

FIG. 3 shows an example of a bid confirmation for the same auction number and products shown in FIGS. 1 and 2.

In FIG. 3, the bidder is prompted to understand that he is ready to accept the terms shown in the example of FIG. 3, should his bid be accepted. In the example of FIG. 3, the loan amount is $226,000, the base rate is 6.875%, with total points of 4.25 APR 7.25%, and a closing date of Dec. 5, 2000 at 12:00 PM (this is one of the options shown in FIG. 2, as described above).

The bidder in FIG. 3, when finalizing his bid by clicking the "Finalize My Bid" button, is prompted to understand that escrow must close no later than Dec. 5, 2000 at 12:00 PM, and that should escrow not close by that date, the bidder understands that, in the example, there is a 1% cancellation fee, or $2,260. The bidder in FIG. 3 can cancel the transaction by clicking the "Cancel My Bid" button.

Once the bidder accepts bid transaction in FIG. 3, the bidder is placed in the approved bidder list.

As previously described, if the pool of funds is exhausted, new bidders would have to increase the points they are willing to pay. This action would replace the lowest bidder (and in the case of multiple low bids that are similar, they would be replaced in reverse chronological order by date of bid). The auction process continues until the deadline arrives. The winning bidders are notified, and are given the deadline to close the transaction.

FIG. 4 shows an illustrative flow process of a direct online mortgage according to the present invention.

In FIG. 4, at step 30, the participant visits the host Web site. The participant has the option of visiting a traditional model at step 32. The traditional model method is for hard to qualify borrowers or borrowers that do not want to participate in an auction format. In general, with a traditional model, the rates, fees and turnaround may be higher.

FIG. 4 assumes that the participant visits the auction model at step 34. As has been described in conjunction with FIGS. 1-3, the participant completes the loan application online, at step 40. The online loan application is either denied at step 42, approved at step 44, or referred to the traditional model at step 46.

If the loan application is approved at step 44, the process goes on to issue a pre-approval at step 50. If the application cannot be pre-approved at step 50, the participant is referred to the traditional model.

With the issuance of the pre-approval at step 50, the process goes to a screening/validation at step 52. If the borrower does not pass the screening/validation at step 52, the participant is referred to the traditional model. If the borrower passes the screening/validation at step 52, the participant goes to step 54, in which he goes to the Web site and bids in the auction of his choice, such as shown in FIGS. 1-3. If the bid is good at step 64 in FIG. 4, the auction closes at step 66, and subsequently, the loan proceeds to a closing. At step 68, the loan is sold through a suitable mortgage conduit, such as FNMA, FHLMC or other conduit.

When bids are not accepted (at step 56 in FIG. 4) because the participant is outbid by other bidders, the process goes to step 60, where the participant can decide to bid again, to wait for the next auction, or to go back to the traditional model.

As shown in FIG. 4, large funding commitments are obtained from secondary mortgage conduits (for example, FNMA, FHLMC, or other conduit) for the purposes of the auction on a regular basis. Participants must have an approval through available automated underwriting, as described above, in order to be able to participate in the auctions. New commitments are purchased as auctions come to a close.

Figure 5:
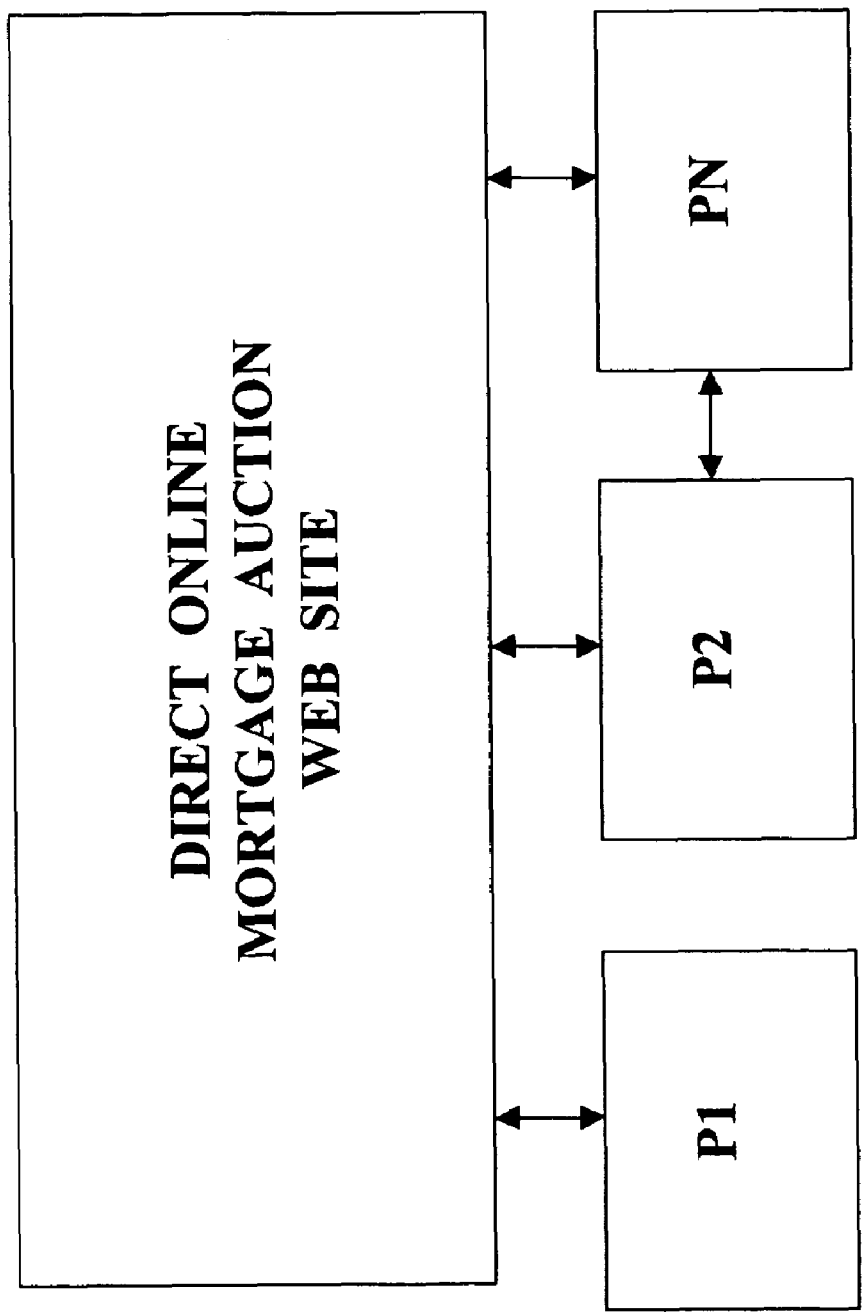
FIG. 5 shows a block diagram of a direct online mortgage auction network according to the present invention.

FIG. 5 shows a block diagram of a direct online mortgage auction network according to the present invention. In FIG. 5, a plurality of potential participants P1, P2, . . . , PN are each directly connected to a Direct Online Mortgage Auction Web Site. As described in conjunction with the above description of FIGS. 1-4, the plurality of participants P1, P2, . . . , PN will, when approved by the automated approval process described above with FIGS. 1-4, bid against one another for a winning bid(s). The winning bid(s) then proceed, as shown in FIG. 4, to step 66, where the auction closes, the loan is processed, and, at step 68, the loan is sold to FNMA, FHLMC, or some other conduit.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A direct online mortgage auction network said network comprising:
   a mortgage auction network Web site, the network Web site for providing access to a preset pool of funds in a secondary mortgage market; and
   a plurality of borrower nodes, each of said borrower nodes, coupled to said mortgage auction network website, said borrower nodes configured to directly access said mortgage auction network Web site, so as to allow users, operating said borrower nodes, to enter a plurality of bids for a mortgage to be awarded from said preset pool of funds in the secondary mortgage market, wherein said bids include, obtaining pre-approval for submitting a bid and submitting a bid at a particular interest rate, wherein upon submission of said bids from said plurality of borrower nodes for said mortgage from said preset pool of funds from the secondary mortgage market, once a predefined time limit is met, said bids are compared to one another and at least one or more of said bids submitted from said borrower nodes, qualifies for a portion of the preset pool of funds in the secondary mortgage market.

2. A network as in claim 1, wherein said borrower nodes electronically complete and submit respective loan applications which are automatically underwritten at said mortgage auction web site.

3. A network as in claim 2, wherein said borrower nodes bid on origination points for a certain interest rate.

4. A network as in claim 3, wherein the pricing of said mortgage from said preset pool of funds in the secondary mortgage market is in real time figures.

5. A network as in claim 4, wherein said preset pool of funds in the secondary mortgage market include auction numbers and type of loan products.

6. A network as in claim 5, wherein each of said mortgage from said preset pool of funds in the secondary mortgage market have a base rate and minimum origination points.

7. A network as in claim 6, wherein said mortgage from said preset pool of funds in the secondary mortgage market include add-on features.

8. A network as in claim 7, wherein said auction network manages a beginning and ending time period.

9. A method for operating a direct online mortgage auction network/system, said method comprising the steps of:
   providing access to a preset pool of funds in the secondary mortgage market via a mortgage auction network web site; and
   providing accessing to said mortgage auction network web site via a plurality of borrower nodes, each of said borrower nodes, coupled to said mortgage auction network website;
   generating pre-approval for submitting bids;
   allowing users, operating said borrower nodes, to enter a plurality of bids at a desired interest rate for a mortgage to be awarded from said preset pool of funds in the secondary mortgage market; and
   once a predefined time limit is met, comparing said bids to one another upon submission of said bids from said plurality of borrower nodes for said mortgage from said preset pool of funds in the secondary mortgage market, so that at least one or more of said bids submitted from said borrower nodes qualifies for a portion of the preset pool of funds in the secondary mortgage market.

10. A network as claimed in claim 1, wherein said mortgages are awarded on bids on the preset pool of funds in the secondary mortgage market until the preset pool of funds is exhausted.

11. A network as claimed in claim 10, wherein once said pool of funds in the secondary mortgage market is exhausted, better qualifying bids replace the lowest bidder.

12. A network as claimed in claim 1, wherein said mortgages are awarded on bids on the preset pool of funds in the secondary mortgage market until there are no more qualifying bids.

* * * * *